H. A. TUTTLE.
REVERSING GEARING.
APPLICATION FILED NOV. 19, 1919.
1,392,985.
Patented Oct. 11, 1921.
2 SHEETS—SHEET 1.
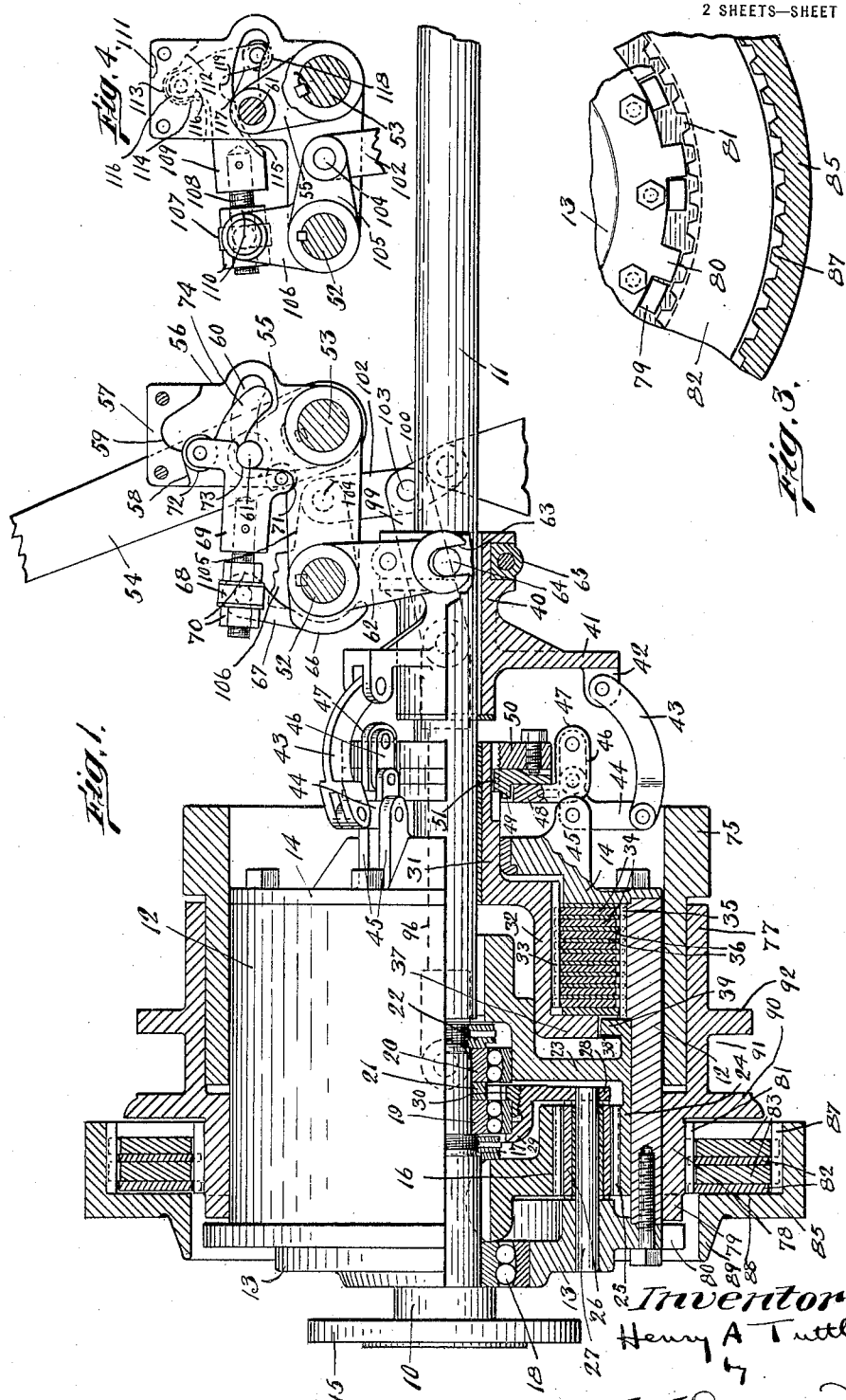

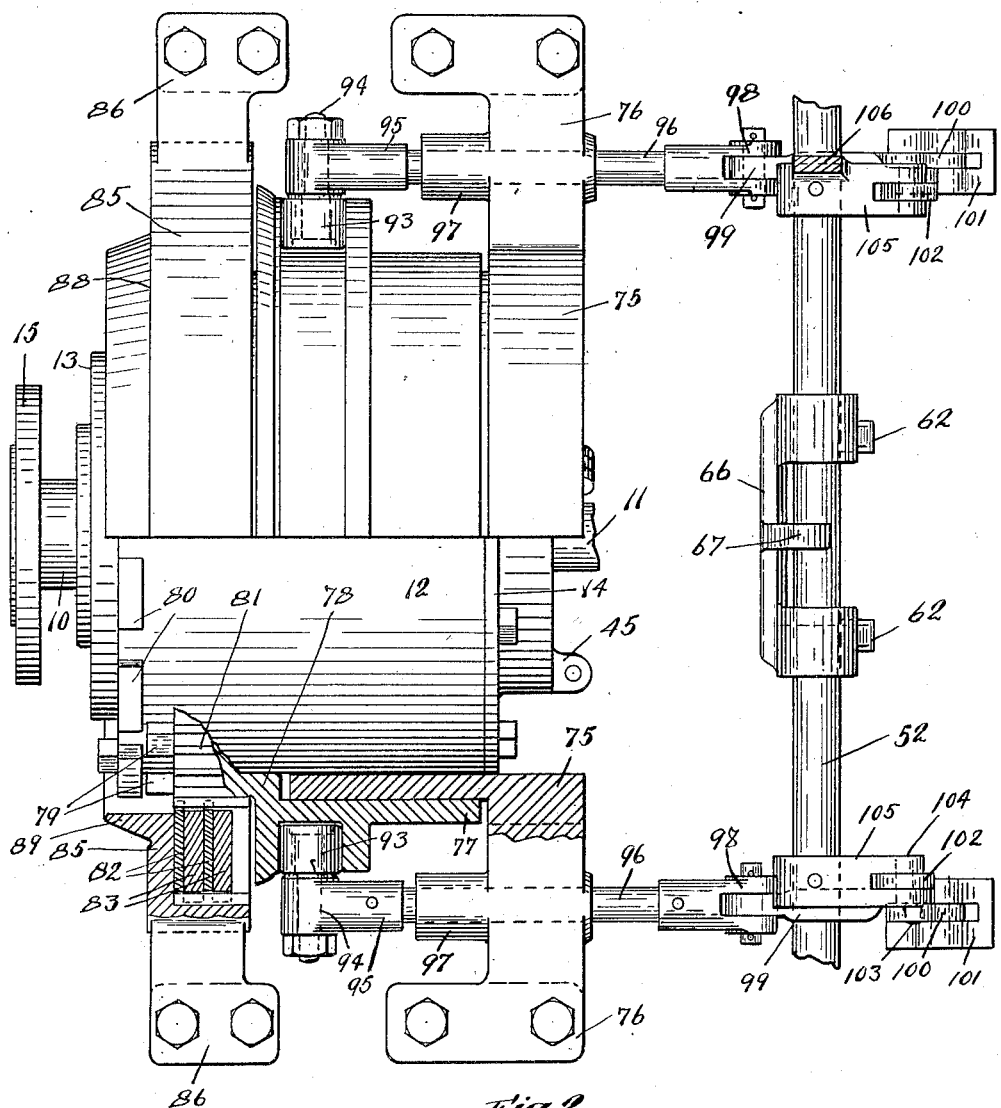
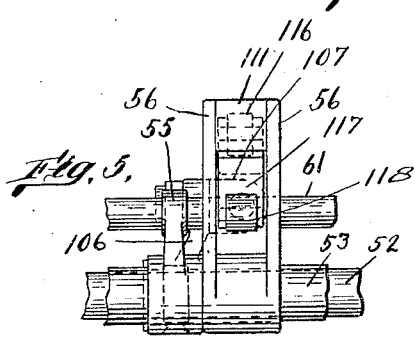

UNITED STATES PATENT OFFICE.

HENRY A. TUTTLE, OF UPTON, MASSACHUSETTS.

REVERSING-GEARING.

1,392,985.   Specification of Letters Patent.   Patented Oct. 11, 1921.

Application filed November 19, 1919. Serial No. 339,103.

*To all whom it may concern:*

Be it known that I, HENRY A. TUTTLE, a citizen of the United States, and resident of Upton, in the county of Worcester and State of Massachusetts, have invented an Improvement in Reversing-Gearing, of which the following is a specification.

My invention relates to reverse gearing of the type wherein independent shafts, as a driving shaft and a driven shaft, may, through such gearing, be so connected as to be directly or reversely rotated; or one, as the driven shaft, remain without rotation while the other is rotating. Such reverse gearing includes, in general, a clutch directly connecting said shafts for direct drive, and gears secured to both of said shafts and pinions meshing with said gears mounted on a pinion carrier or case, the rotation of which is controlled by a brake for reverse drive.

It has heretofore been common to secure reverse drive by utilizing a brake to restrain the pinion carrier or case against rotation; the brake comprising a resilient band adapted to encircle the case and be contracted against its walls.

While the band type of brake is suitable for gearing adapted for the transmission of small powers, it cannot be made to have sufficient braking surface to prevent rotation of the case when adapted for gearing designed to transmit large powers, and slipping and consequent heating results; even when relatively great force is applied to the ends of the resilient band to contract it.

It is an object of my invention to provide clutching or braking means for the pinion carrier or case comprising a plurality of co-acting plates or disks associated with the case and a stationary component of the gearing adapted to be pressed into engagement to secure reverse drive whereby ample clutching or braking surface is obtained.

If the clutch plates were positively secured to the gearing casing, when the gearing was in condition for direct drive, and the casing consequently rotating, there would be an appreciable drag between the moving and stationary clutch plates, due to the viscosity of the lubricant employed on the clutch plates, and this drag would result in a considerable loss of power.

In view of this fact, another object of my invention is the provision of means to positively connect the clutch plates associated with the gearing casing with said casing for reverse drive which admits of their being freed from said casing in direct drive, whereby said casing may revolve independently of said clutch plates.

A further object of my invention is to provide independent operating mechanisms for the brake and clutch mechanisms and a common operating handle; so arranged that each operating mechanism is independently moved between neutral and an operated position and is locked in neutral position.

Certain features of this invention are disclosed in my co-pending applications Serial No. 176,673, filed June 25, 1917, and Serial No. 344,532, filed December 13, 1919.

Figure 1 is a view in side elevation, partly in section, illustrating the gearing embodying my invention.

Fig. 2 is a plan view, partly in section, of the gearing.

Fig. 3 is a sectional detail of the brake clutching means.

Fig. 4 is a detail of the brake operating mechanism.

Fig. 5 is an end view of mechanism shown in Fig. 4.

As here shown, the reversing gearing includes a driving shaft 10, a driven shaft 11 and a casing having a cylinder or barrel portion 12 and end plates or walls 13 and 14. Driving shaft 10 terminates, without the casing, in a flange 15 by means of which said shaft may be coupled with an engine shaft and by which it may be rotated. A spur gear 16 is fixed to said shaft within the casing by a Woodruf key and a nut 17 threaded on to the shaft. Said shaft operates in a ball bearing 18 secured in said end plate 13 and the nut 17 also serves to maintain the inner race of said bearing in position on said shaft.

The end of the shaft within the casing, beyond said nut 17 is reduced in diameter and two ball bearings 19 and 20, are disposed thereon and spaced apart by the spacing ring 21 and secured thereon by the nut 22 threaded on the end of the shaft. The outer race of bearing 20 fits within an annular recess in the wall of an internal gear 23 keyed to the driven shaft 11.

Said internal gear 23 is provided with a cylindrical portion 24 closely fitting within, but independent from, the casing 12 and is provided with internally formed gear teeth 25. Pinions 26 engage the teeth of said internal gear and the spur gear 16, whereby said driven shaft may be reversely rotated by said driving shaft. Said pinions 26 are rotatably mounted on pins 27 fixed in the end plate 13 of the casing and in the plate 28 carried by said driving shaft.

Said plate 28 is formed with a central opening therein and the outer race of said bearing 19 is disposed therein and secured between the flange 29 and the threaded nut 30. Said plate 28, the end wall 14, and the pins 27 comprise a carrier for pinions 26.

The clutching mechanism for connecting the driving and driven shafts for forward drive includes a clutch plate carrier having hub 31 slidably arranged on the driven shaft 11 beyond the internal gear secured on the end thereof. Beyond the hub portion, the plate carrier is formed with an enlarged annular portion 32 of sufficient diameter to receive the hub of the internal gear 23, formed with a series of gear teeth 33 on its periphery adapted to engage corresponding teeth on clutch plates 34. The cylindrical portion 12 of the casing adjacent to end wall 14 is provided with a series of gear teeth 35 adapted to engage corresponding teeth on clutch plates 36. The toothed connection between the clutch plates and the plate carrier and casing form means by which the plates may be longitudinally moved to cause their engagement or disengagement, but which prevent rotation of the plates independent of their respective carriers.

The end of the annular portion 32 of the plate carrier is formed with a radially extended flange 37 provided with plurality of teeth 38 and the cylindrical portion 24 of the internal gear is formed with an inwardly extended flange 39 having teeth adapted to be engaged by the teeth 38 on the plate carrier when the clutch is in the engaged condition, thereby to connect the clutch plate carrier to the driven shaft and to be disengaged therefrom when the clutch is in the disengaged condition, thereby to free the clutch plate carrier from the driven shaft.

By the construction above set forth the clutch plate carrier is free from any revolving component of the gearing when it is in condition for reverse drive, or in neutral, and consequently there is no power loss in the clutch to cause a friction or drag between the clutch plates.

A thrust sleeve 40 is slidably and rotatably mounted on the driven shaft and forms part of the clutch actuating mechanism. Said sleeve is formed with an outwardly extending flange 41 having lugs 42 to which the links 43 are pivoted. Said links 43 are also pivotally connected to similar arms of bell crank levers 44 which are pivoted to outwardly extended lugs 45 of the end plate 14 of the gear casing. The other arms of said bell crank levers are pivoted to the links 46 which are in turn pivoted to the axially extended ears 47 of the ring 48, which ring is adapted to engage the thrust ring 49.

The hub 32 of the clutch plate carrier extends through a bushing or bearing in the end plate 14 of the gear case and is provided with an exteriorly threaded portion to receive the clutch adjusting collar 50. Said hub is formed with a key way to receive an extension 51 of the thrust ring 49 whereby said ring is restrained from rotation on said shaft but is free for longitudinal movement thereon.

The operating mechanism whereby the gearing may be set in condition for direct drive, neutral, or reverse drive includes what may be termed a forward shaft 52 and a rear shaft 53 which may be supported by suitable means not necessarily illustrated. An operating handle 54 is fixed to the rear shaft 53 at any convenient point while at a point above the thrust sleeve, said shaft also has secured thereon the arms 55.

A locking guide 56 is supported upon the shafts 52 and 53 and is preferably in the form of spaced-apart plate sections of approximately right angular form, the horizontal portion affording bearing for the respective shafts and the vertical portion extending above the rear shaft. The upper ends of the plates forming the vertical portion of the guide are connected by a spacing block 57 having its lower surface formed with a cam face. The cam face presents, from its forward edge, an upwardly and rearwardly inclined part 58 abruptly terminating in a circularly curved portion 59 from which the cam face is downwardly extended to the edge of the block. The vertical portions of said spaced-apart plates are further formed with arcuate slots 60 therein and a guide shaft or pin 61 is arranged to move therein. The terminals of said guide shaft beyond the guide are mounted in the arms 55 carried by said rear shaft 53.

The forward shaft 52 is provided with spaced-apart depending arms 62 loosely arranged thereon and having terminal recesses 63 loosely engaging pins 64 disposed in diametrically opposed relation on a collar 65 mounted for free rotative movement in a channel or way formed at one terminal of the thrust sleeve 40, which construction provides for moving the sleeve longitudinally of the driven shaft independent of the rotative action of said sleeve.

Above the shaft 52 the arms 62 are connected by a bridge 66 formed with upwardly extended lugs 67. Said lugs are formed with transverse openings therein to pivotally receive a cross member 68, and said cross member is formed with a transverse opening in which the threaded extension of a trip block 69 is adjustably secured by nuts 70.

Said trip block 69 is positioned between the side plates of the guide and is provided with a depending lug in which is pivoted a roller 71 which is adapted to be engaged by the pin or guide shaft 61 on the arms 55 upon movement of said arms from neutral to direct drive position. On the trip block above the roller 71 is an upwardly extended lug to which is pivoted the roller 72 which is adapted to engage the cam face of the guide block 57. The end portion of said trip block is provided with two vertical faces separated by the circularly grooved portion 73 into which the pin 61 is adapted to fit in certain positions of the arm 55 and the sides of said blocks are provided with longitudinally extended arcuate fingers 74, which in certain positions of the blocks 69, are adapted to have their lower arcuate faces coincident with the upper face of the slot 60 in the guide plate 56. Said fingers are adapted to be maintained in said position against downward movement by pin 61 as shown in Fig. 4. The fingers 74 are formed with circularly shaped recesses therein conforming to, and continuing, the circular arc 60 formed in the end portion of the trip block 69, and said groove or recess 73 is adapted to receive the pin 61 whereby the movement of said pin to the right actuates the trip block to operate the clutch mechanism.

It is seen that, in the position shown in Fig. 1, the clutch is in the engaged position and the clutch operating mechanism is disposed with the pin or guide shaft 61 in the circularly formed slot or recess 73 in the trip block 69 and that said trip block is restrained from disengagement from said pin 61 by means of the contact of the upper roller 72 carried thereby with the cam face 58 in the guide block 57. In a movement of the operating handle 54 to the right toward neutral position, the engagement of said slot 73 of the trip block causes said trip block 69 to be correspondingly moved to cause the clutch to disengage and, in such disengaged position, the trip block has been moved to such a position that its upper roller 72 is disposed in the groove or depression 59 in the guide block 57 and the arcuate fingers 74 are positioned with their lower faces coincident with the top surface of the slot 60 in the guide plate 56. In such neutral or clutch disengaged position, the guide shaft 61 is disengaged from the trip block 69 and is free to move further toward the right or the reverse drive position of the gearing. In such a movement of said guide shaft from neutral to reverse drive position, it maintains the trip block 69 in elevated position with roller 72 in the recess 59 of the guide block 57 because of its engagement with the arcuate fingers 74, and consequently said trip block and the associated clutch mechanism is restrained from further movement during a movement of the operating handle 54 to the reverse drive position. During such further movement, the operating handle serves to actuate the reverse drive mechanism, as is herein described and explained.

Upon a movement of said operating handle from neutral to direct drive position, the guide shaft or pin 61 engages the lower roller 71 of the trip block and forces the roller 72 carried thereby from engagement with the guide block 57 and causes the recess 73 in said trip block to engage said guide shaft 61, and, upon a further movement of said guide shaft, the trip block is actuated by said shaft to set the clutch in condition for direct drive.

The cylindrical portion 12 of the gear casing is concentrically arranged within a sleeve or drum 75 adapted to be stationarily secured in position around said casing, but without engaging said casing at any point, by means of laterally extended feet 76 which are, or may be, attached to stationary supports not necessarily shown. The outer portion of said sleeve forms a bearing or support on which the reverse clutch plate carrier is adapted to longitudinally slide in a movement to reverse drive or neutral position.

The reverse clutch plate carrier comprises a cylindrical portion 77 disposed over and in sliding engagement with the stationary sleeve or clutch carrier support 75, and a second cylindrical portion 78 of reduced diameter adapted to be concentrically disposed about, but not in engagement with, the gearing casing. Said portion 78 is formed at one edge with a series of teeth 79 adapted to engage teeth 80 formed on the end plate 13 of the gear casing projecting therebeyond whereby said reverse drive clutch plate carrier may be positively connected to the gearing casing for the purpose of conditioning the gearing for reverse drive, as is hereinafter described.

Said cylindrical portion 78 of the reverse clutch plate carrier is formed upon its outer periphery with a plurality of gear teeth 81 which are adapted to slidably engage certain clutch plates 82 of the reverse drive clutch, and said plates are also formed with gear teeth adapted to engage the teeth in the reverse drive clutch plate carrier. The other active members of said clutch, comprising clutch plates 83, are formed at their outer peripheries with gear teeth adapted to slidably engage gear teeth 87 formed in the inner circumference of a stationarily supported ring 85.

Said ring 85 comprises the stationary reverse drive clutch plate carrier and is concentrically arranged about the gearing casing, but not in engagement therewith. Said ring is provided with laterally extended feet 86 whereby it may be stationarily secured about said gearing casing against rotation when said reverse clutch is operated. Said ring is formed with a radial inwardly extending flange 88, which serves as a backing or support against which is exerted the thrust from the clutch when in its engaged condition, and said flange is provided with a cylindrical portion 89 adapted to form a cover or shield for the teeth on the wall 13 of the gearing casing.

The revoluble reverse clutch plate carrier is provided at the junction of the two cylindrical portions 77 and 78 with an outwardly extending flange 90 between which and the stationary flange 88 the clutch plates are adapted to be pressed to secure the gearing casing against rotation for reverse drive. The flange 90 also forms a wall for the annular ring or slot 91 formed on the reverse plate carrier, of which the flange 92 disposed on the cylindrical portion 77 thereof, forms the other wall.

Two rollers 93 are disposed in said slot 91 in diametrically opposed relation and are adapted to engage either of the walls 90 or 92 in a movement of the clutch operating mechanism to move the clutch to engaged or disengaged position. Said rollers are revolubly mounted on the extremities of pins 94 secured in the enlarged heads 95 of the reverse clutch operating rods 96.

Rods 96 are slidably arranged in bosses 97 on the feet 76 of the drum 75 and terminate in forked ends 98 at a point approximately beneath the shafts 52 and 53. Said rods are connected by means of pins to links 99, to the other end of which are pivoted the links 100 which are movably secured to fixed supports 101. Links 99 and 100 form reverse clutch operating toggles by means of which the reverse clutch is operated.

A link 102 is connected to the pivoted connection 103 between the two links 99 and 100 of said toggles and the other end of one of said links is pivoted at 104 to the arm 105 of a bell crank lever keyed to the forward shaft 52. The other of said links 102 is pivoted to arm 105 keyed to said forward shaft 52.

The other arm 106 of said bell crank lever has pivotally secured therein a transverse member 107. Said transverse member is formed with a transverse opening therein and the threaded extension 108 of a reverse trip block 109 is secured therein by the nuts 110.

Reverse trip block 109 is disposed between the side plates of a guide disposed on the forward shaft 52 and rear shaft 53. Said reverse guide is similar in design and disposition to the clutch guide, with the exception that the guide block 111, positioned between the side plates at the upper ends thereof, is reversed with respect to its cam face and the upwardly sloping surface 112 thereof extends from the rear edge of the guide block and terminates in a circularly formed recess 113 ending in an abrupt shoulder 114 of said block.

The reverse trip block 109 is formed with a lower arcuate surface 115 over which the guide shaft 61 is adapted to pass in a movement of the operating handle between direct drive and neutral position, during which motion said trip block 109 is inoperably connected therewith, and said trip block is formed with upwardly extended lugs between which is pivoted a roller 116 adapted to engage the cam face of guide block 111. The end portion of said trip block is provided with the depending arm 117 to which is secured the roller 118 engageable with the guide shaft 61 to cause said trip block and associated reverse drive mechanism to be moved between neutral and reverse drive positions. Said block is provided with the circularly formed recess 119 in the lower face thereof between the arcuate face 115 and the depending arms or fingers 117 adapted to receive said guide shaft 61.

In the operation of the reverse gearing operating mechanism, a movement of the operating handle 54 between direct drive and neutral position serves to operate the clutch mechanism as has been heretofore described; the reverse trip block, during such operation, being inoperatively connected with said operating handle 54 and maintained against movement from disengaged position by the locking of the roll 116 of the guide block 111 in the recess 113 in which the upper roll 116 of said trip block is maintained by the engagement of the guide shaft 61 with the arcuate face 115 of said trip block.

Previous to the movement of said operating handle from neutral to reverse drive position, the clutch operating mechanism will have been operatively disconnected from the operating handle and locked against further movement as heretofore described, and the motion of the guide shaft 61 in the direction to set the gearing in condition for reverse drive causes said shaft to engage with the lower rolls 118 of said reverse trip block 109, thereby forcing the upper roller 116 from engagement with the recess 113 in the reverse guide block 111 and causing the trip block to engage said shaft 61 whereby the continued movement of said shaft to reverse drive position carries with it said trip block, and consequently serves to operate the associated mechanism to condition the reverse clutch for reverse drive.

In a movement of said guide shaft toward the left, Fig. 1, or neutral position, the trip block 109 is correspondingly moved to neutral position, the upper roller 116 thereof moving along the cam face 112 in the guide block 111. When neutral position is reached and the disposition of said roll 116 against the abutment or shoulders 114 of said guide block 111 prevents further movement thereof, said guide shaft 61, in its continued movement, acts against the wall of the recess 119 in said trip block to raise said trip block to force said roller carried thereby into closer engagement with the recess 113 in said guide block 111, thereby to permit said shaft 61 to pass under said trip block 109 for the operation of the direct drive mechanism, the reverse drive mechanism being now maintained against movement in any direction.

It is thereby seen that, with the arrangement of trip blocks independently connected to the direct and reverse drive mechanisms of the gearing as above described, the independent operation of each mechanism is obtained, the inoperated mechanism being operatively connected from the operating handle or associated parts and locked against movement.

The movement of the reverse trip block 109 to reverse drive position serves to actuate the bell crank lever associated therewith to straighten the toggles formed of links 99 and 100. The motion imparted to said toggles is transmitted through the operating rods 96 to cause the roller 93 secured at the ends thereof to bear against the wall 90 of slot or groove 19 in the movable reverse clutch plate carrier to cause said carrier to slide longitudinally on the stationary supporting drum 75.

Such movement of said carrier serves to cause the engagement of its teeth 79 with the corresponding teeth 80 in the end plate 13 of the gearing casing whereby the carrier and casing are secured against relative rotary movement. The pitch of the teeth in the end wall 13 and clutch plate carrier is adapted to be greater than the width of the teeth whereby their engagement is facilitated when the gearing casing is in motion.

The continued movement of the reverse clutch plate carrier compresses the clutch plates between the stationary wall 88 of the stationary reverse clutch plate carrier and the wall 90 of the movable clutch plate carrier, and thereby serves to hold the gearing casing and consequently the pinion carrier from rotation, whereby the driven shaft is reversely rotated.

In a movement of the clutch carrier to disengaged position, the teeth 79 thereof are disengaged from the teeth 80 of the end wall 13 of the gearing casing, and the reverse clutch is therefore entirely disconnected from the gearing casing when the gearing is in neutral or direct drive condition. Such disposition of reverse clutch has an advantage in that there is no loss of power in the clutch plates due to the drag or friction between said plates when the casing is revolving in direct drive condition, as there would be if certain of the clutch plates were positively secured to said casing, and therefore the gearing may transmit under all operating conditions a maximum of power from the driving shaft 10 to the driven or propeller shaft 11.

I claim:

1. A reversing gearing having a driving shaft, a driven shaft, gearing connecting said shafts for reverse drive, and brake mechanism to secure reverse drive comprising a set of clutch plates arranged normally to be free from driving connection with said gearing, a stationary member, a second set of clutch plates carried thereby, and means positively to connect said first set of clutch plates with said gearing and effect the engagement of said sets of clutch plates.

2. In a reversing gearing, a driving shaft, a driven shaft, gearing connecting said shafts for reverse drive, a casing inclosing said gearing, a set of clutch plates for said casing arranged normally free of said casing, a stationary member, a second set of clutch plates carried by said stationary member, and means to connect said first set of clutch plates with said casing and subsequently effect the engagement of said sets of clutch plates.

3. In a reversing gearing, a driving shaft, a driven shaft, gearing connecting said shafts for reverse drive, a casing inclosing said gearing, a set of clutch plates for said casing disposed on the periphery of and arranged normally free of said casing, a stationary member, a second set of clutch plates carried by said stationary member, and means to connect said first set of clutch plates with said casing and subsequently effect the engagement of said sets of clutch plates including a rotatably supported and axially movable member surrounding said casing and bearing said first set of clutch plates having means removable to engage positively said casing admitting of axial movement in positive engagement therewith to effect the engagement of said sets of clutch plates.

4. In a reversing gearing, a driving shaft, a driven shaft, gearing connecting said shafts for reverse drive, a casing inclosing said gearing, a set of clutch plates for said casing arranged normally free of said casing, a stationary member, a second set of clutch plates carried by said stationary member, and means to connect said first set of clutch plates with said casing and subsequently effect the engagement of said sets of clutch plates including a stationary cylindrical member surrounding said casing at one end thereof, a second cylindrical member bearing said first set of clutch plates rotatable and axially movable on said cylindrical member and extended toward the other end of said casing, said casing free for rotation within said cylindrical members, and said casing and second cylindrical member having coöperating clutching means arranged positively to connect said second cylindrical member and the clutch plates carried thereby in driving engagement with said casing.

5. In a reversing gearing, a driving shaft, a driven shaft, gearing connecting said shafts, clutching mechanism to secure direct drive, a casing inclosing said gearing, a clutch plate carrier having casing engaging means movable into driving engagement with said casing, clutch plates carried thereby, a non-rotatable member, clutch plates carried thereby, said clutch plates engageable to secure reverse drive.

6. In a reversing gearing, a driving shaft, a driven shaft, gearing connecting said shafts, clutching mechanism to secure direct drive, a pinion carrier included with said gearing, a clutch plate carrier having pinion carrier engaging means, a support for said clutch plate carrier which admits of the movement of said carrier thereon, clutch plates carried thereby, a non-rotatable member, clutch plates carried thereby, said clutch plate carrier engageable with said pinion carrier and said clutch plates engageable to secure reverse drive.

7. In a reversing gearing, a driving shaft, a driven shaft, gearing connecting said shafts, clutching mechanism to secure direct drive, and other clutching mechanism to secure reverse drive including a casing inclosing said gearing having projecting teeth, a clutch plate carrier having projecting teeth movable to admit of the engagement of its teeth with, and disengagement from, the teeth of said casing, clutch plates carried by said carrier, a non-rotatable member, and clutch plates carried by said member coöperating with said other clutch plates for reverse drive.

8. In a reversing gearing, a driving shaft, a driven shaft, gearing connecting said shafts, clutching mechanism to secure direct drive, and clutching mechanism to secure reverse drive including a pinion carrier having projecting teeth, a clutch plate carrier having projecting teeth movable into driving engagement with said pinion carrier, a non-rotatable support on which said clutch plate carrier is slidably mounted, clutch plates carried by said clutch plate carrier, a second non-rotatable support, and clutch plates carried thereby.

9. In a reversing gearing, a driving shaft, a driven shaft, gearing connecting said shafts, clutching mechanism to secure direct drive, and clutching mechanism to secure reverse drive including a casing having peripheral teeth, a clutch plate carrier, having teeth surrounding said casing, a non-rotatable cylindrical carrier-supporting drum surrounding and independent of said casing, said carrier slidably supported on said drum and movable into driving engagement with said casing, a non-rotatable annular support disposed over said clutch plate carrier, and clutch plates carried thereby 10. In a reversing gearing, a driving shaft a driven shaft, gearing connecting said shafts to secure reverse drive, clutch mechanism adapted to connect said shaft to secure direct drive, clutch mechanism to secure reverse drive, both clutch mechanisms comprising two sets of clutch plates, and both clutch mechanisms characterized by having one set of clutch plates normally free from driving connection with its driving member and means to effect the positive engagement of said normally free sets of clutch plates with their driving members and the clutching engagement of the plates of the sets.

In testimony whereof, I have signed my name to this specification.

HENRY A. TUTTLE.